Aug. 11, 1959 C. H. PEARSON 2,899,067
THREE-WAY CONTROL VALVE
Filed April 5, 1957 2 Sheets-Sheet 1
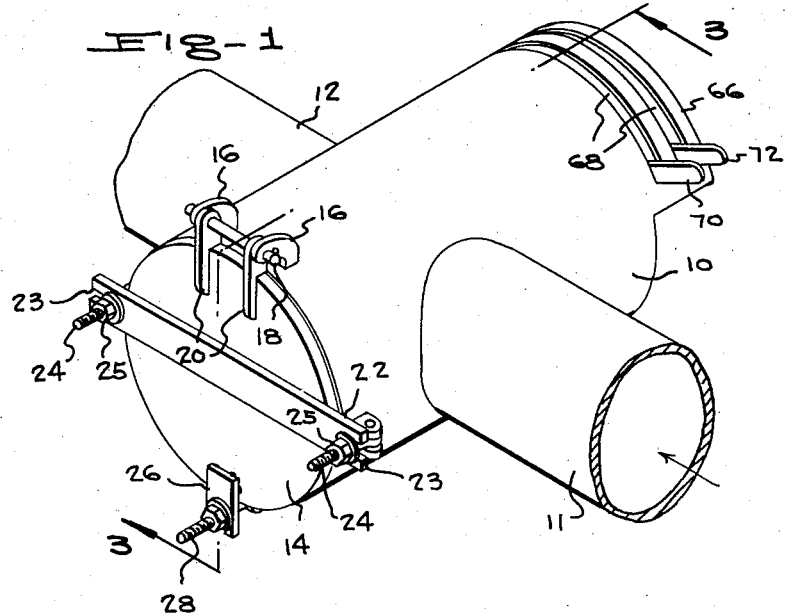
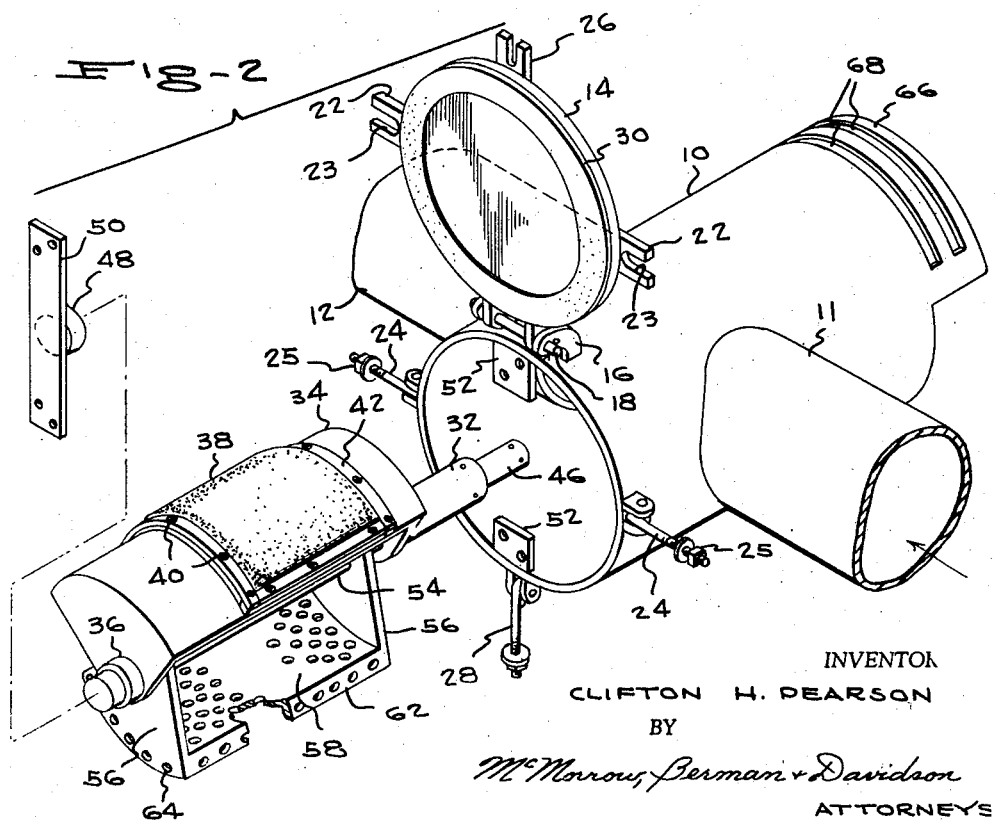
INVENTOR
CLIFTON H. PEARSON
BY
McMorrow, Berman & Davidson
ATTORNEYS Aug. 11, 1959
C. H. PEARSON
2,899,067
THREE-WAY CONTROL VALVE
Filed April 5, 1957
2 Sheets-Sheet 2
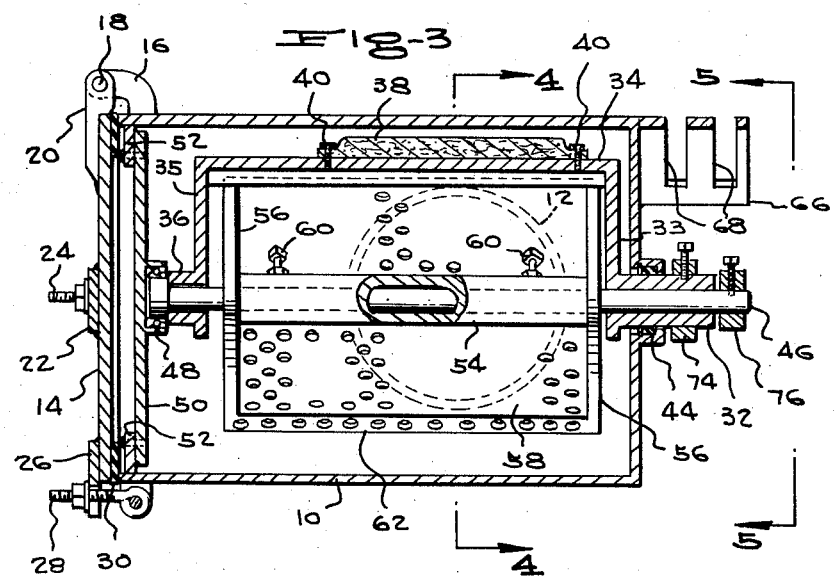
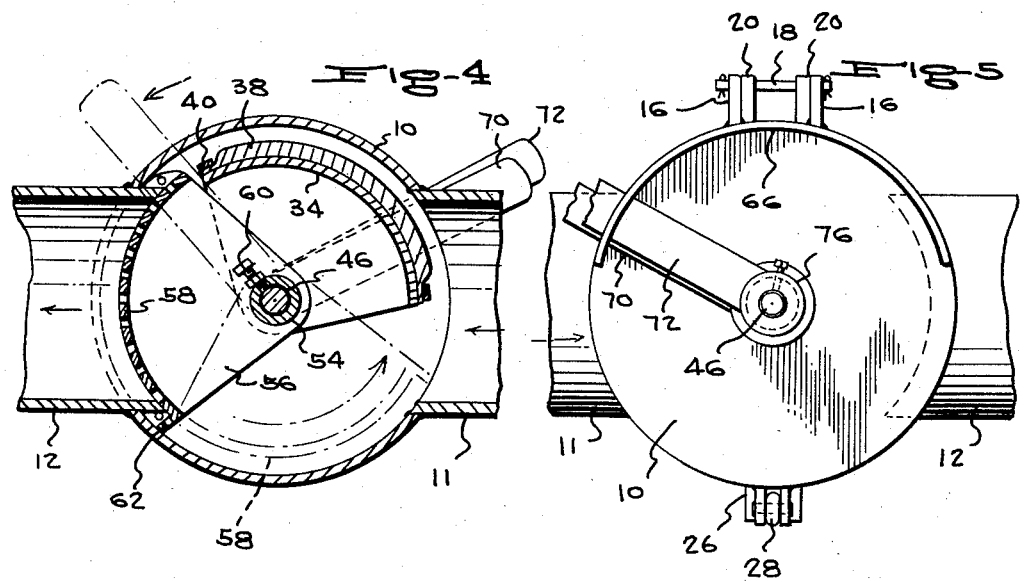
INVENTOR.
CLIFTON H. PEARSON
BY
*McMorrow, Berman & Davidson*
ATTORNEYS

United States Patent Office 2,899,067
Patented Aug. 11, 1959

2,899,067

THREE-WAY CONTROL VALVE

Clifton H. Pearson, Imperial, Tex.

Application April 5, 1957, Serial No. 650,932

8 Claims. (Cl. 210—390)

This invention, relating generally to valves, has particular reference to a valve incorporating a gate and a strainer, swinging independently of each other within a cylindrical housing or body arranged transversely of the direction of flow, with the gate and strainer swinging about the axis of the housing.

Among important objects of the invention are the following:

To provide a valve usable to advantage in controlling and straining the flow of any fluid, whether liquid or gaseous;

To permit swift operation of the flow shut-off element and strainer element either conjointly or independently;

To provide a valve that will be adapted particularly for use in screening debris out of suction lines, that is, at the input side of pumps, thus to prevent the debris from reaching the working parts of the pumps;

To provide a valve that will have a three-way operation resulting from selective positioning of the gate and strainer relative to each other, with said components in one relationship permitting free, unstrained flow of fluid through the valve, the valve being closed in another selected relationship of said components, the valve being open and straining the flow therethrough in a third relationship of these components;

To provide a valve that will be usable not only in the particular situation described above, but also in storage tanks, oil, gas, air or water lines, and in open pits; and To permit swift and easy access to the screened debris for cleaning the valve whenever necessary.

Other objects will appear from the following description, the claims appended thereto, and from the annexed drawing, in which like reference characters designate like parts throughout the several views, and wherein:

Figure 1 is a perspective view of the valve connected operatively with fragmentarily shown inlet and outlet pipes;

Figure 2 is an exploded perspective view of the valve;

Figure 3 is an enlarged longitudinal section on line 3—3 of Figure 1;

Figure 4 is a transverse section on the same scale as Figure 3, taken substantially on line 4—4 of Figure 3, showing in dotted lines another position of one of the levers; and Figure 5 is an end elevation on the same scale as Figure 3, showing the valve as seen from line 5—5 of Figure 3.

Referring to the drawing in detail, a cylindrical, constant-diameter housing or body 10 extends transversely of inlet and outlet pipes 11 and 12. The housing communicates intermediate its ends with the pipes, and is fixedly connected thereto at diametrically opposite locations of the housing (Figure 4).

One end of the housing is formed open to provide access to debris accumulating therein, and is normally closed by a flat, circular door 14 swingably connected to laterally spaced brackets 16 (Figure 1) through the provision of a hinge pin 18, passing through the brackets and through ears 20 rigid with and projecting upwardly from the door in positions embraced by the brackets.

A diametrically extending cross bar 22, fixedly connected to and projecting at its opposite ends beyond the door, has end notches 23 (Figure 2), receiving side clamp bolts 24 pivoted on housing 10. Nuts 25 on the bolts bear against the cross bar. At the bottom of the housing, an ear 26 fixed to the door has an end notch receiving a bottom clamping bolt 28. The door, in its closed position, thus is forced axially of housing 10, being sufficiently loose on its hinge to permit the desired axial movement. A peripheral gasket 30 on the door is thus forced against the housing to provide an effective seal about the door.

Projecting out of the permanently closed other end of the housing is a hollow gate support shaft 32 integral with the segmentally shaped end plate 33 of an elongated, imperforate gate or flow shut-off 34. Gate 34 is transversely curved about the long axis of the housing through slightly more than 90° (Figure 4). At its door-adjacent end the gate includes a segmentally shaped end plate 35 integral with a hollow stub 36.

A gasket 38 is secured at its periphery to gate 34 in overlying relation thereto, by spaced screws 40 (Figure 2) passing through hold-down or clamping strips 42.

Referring to Figure 3, shaft 32 is journalled in a bearing 44 mounted in the closed end of the housing. Beyond the outer end of the shaft 32, projects one end of a shaft 46 journalled in shaft 32. The other end of shaft 46 is journalled in stub 36, which bears in a bearing 48 carried by a cross bar 50 extending diametrically of the open end of the housing (Figures 2 and 3). Cross bar 50 is detachably connected at its ends to diametrically opposed, radially inwardly extending ears 52 of the housing.

Shaft 46 also extends through a sleeve 54 (Figure 3) fixedly connected between segmental end plates 56 of a transversely curved strainer 58. Set screws 60, threaded in and spaced longitudinally of sleeve 54, fixedly engage shaft 46 for conjoint rotation of shaft 46 and strainer 58, in selected positions to which the strainer is rotatably adjusted upon and fixedly secured to the shaft 46.

Referring to Figure 4, along one longitudinal edge the strainer is formed with a perforated, radially outwardly extending lip 62 having wiping contact with the wall of the housing. Further, the arcuate edges of the end plates 56 (see Figure 2) are also perforated, as at 64.

Fixed to and projecting beyond the closed end of the housing is an arcuate handle guide plate 66 having transverse guide slots 68 in which are slidably engaged the outer end portions of radially extending handles 70, 72 (Figures 1 and 5). These are respectively rigid with set collars 74, 76 connected to shafts 32, 46 respectively, as shown to best advantage in Figure 3.

In use, and assuming that the valve is open, the parts will appear as in full lines in Figure 4. Strainer 58 is in position over the outlet pipe 12 in contact with the end edge of said pipe. It is important to note that pipe 12 (but not pipe 11) projects into the housing a short distance. The strainer, thus, has its outer surface spaced from the housing wall a corresponding distance.

By reason of this arrangement, trash will be stopped by the strainer while the fluid may still pass freely through the valve. The trash is thus confined in the housing, and may be forced laterally into the respective end portions of the housing.

When it is desired to clean out accumulations of debris, one swings strainer handle 72 to its opposite extreme position, as shown in dotted lines in Figure 4, and this causes the strainer to move to its dotted line position in this figure of the drawing, clear of the outlet pipe. Simultaneously with this movement of handle 72, handle 70 is thrown to shift gate 34 counterclockwise in Figure 4 to a position closing the outlet. Although the gate body is curved on a smaller radius than the strainer, the outer surface of the gasket 38 is curved on approximately the same radius as strainer 58 to bear tightly against the end of the outlet pipe, preventing flow from the housing into the outlet pipe.

Another valve, not shown, of any desired type would be located upstream from the valve of the invention. Accordingly, with said other valve also being closed at this time, one may open the cleanout door to remove the accumulation of trash. Thereafter, both handles would again be grasped and thrown simultaneously, to open the valve, so as to again permit flow therethrough.

As previously brought out herein, the gate and the strainer are swingable independently of each other, it being stated in one of the objects hereinabove set forth that it is proposed to permit swift operation of the flow shut-off element and strainer element either conjointly or independently. In this connection, in the paragraphs immediately above, there has been specifically described the conjoint operational characteristics of the strainer and gate. In said paragraphs, it has been brought out how, with the strainer and gate in their full line, Figure 4, positions, they can be conjointly moved counterclockwise in Figure 4 by simultaneous throw of the handles 70, 72 connected to the gate and strainer respectively. It has also been described how this movement will shift the strainer from its full line, Figure 4, position off the outlet, simultaneously with movement of the gate from its Figure 4 position into a position across the outlet.

It has further been described in the paragraphs above how, after removal of an accumulation of trash with the valve in closed position, both handles can again be thrown simultaneously to open the valve. This would return the strainer and gate to their full line, Figure 4 positions.

It now becomes appropriate to consider the independent rather than the conjoint movement of the gate and strainer. Assuming that the strainer is in the full line position thereof shown in Figure 4, and the gate is in its full line Figure 4 position, throw of the handle 72 to the dotted line position thereof shown in Figure 4 will cause the strainer to travel counterclockwise in Figure 4 from the full line to the dotted line position of the strainer shown in this figure of the drawing. The handle shown in dotted lines in Figure 4, as will be observed, is the longer handle, and hence, would be the handle 72 which has previously been described herein as being connected with the strainer.

Figure 4 thus shows the gate in only one position, but shows the strainer in two positions, namely, a full line position in which it causes straining of fluids passing through the valve, and the dotted line position in which it is disposed clear of the outlet, in diametrically opposed relation to the gate.

In said dotted position of the gate, it follows that there will now be free, that is, unstrained, flow of fluid through the valve. This is by reason of the fact that the gate and strainer are disposed at opposite sides of and clear of the outlet, in diametrically opposed relation.

It is thus clear that there is a three-way operation, resulting from the capability of the gate and strainer of being shifted independently of each other. In one operating position of the valve, there is a screened or strained flow of fluid through the open valve. In a second operational arrangement, there is a free, unstrained flow of fluid through the open valve. In the third operational arrangement, the valve is closed.

Although I have not dwelled on reasons for providing the three-way operation, as distinguished from a two-way operation in which the gate and strainer would only be movable conjointly with each other between a strained-flow-permitting position and a flow-preventing position, said reasons nevertheless exist and may be readily stated.

One reason for permitting free, unstrained flow with the strainer in the dotted line position shown in Figure 4 and the gate diametrically opposite the same at the other side of the outlet is to permit flushing of debris from the concave face of the strainer. In other words, when the strainer is in the dotted line position shown in Figure 4, fluid will flow past the same, impinging against the concave face, in such a way as to dislodge particles that may have engaged in the perforations of the strainer. Said particles, and other accumulations of foreign matter, would be flushed out of the valve, through the outlet. Downstream from the valve, the flushing liquid may be discharged as waste. Subsequently, the parts may be retained to the strain-flow-permitting position, to permit normal use of the fluids passing therethrough.

It may be observed, in this regard, that when the strainer is in the dotted line position shown in Figure 4, some of the fluid may be trapped between the strainer and the adjacent portion of the housing wall. This fluid would be forced upwardly in Figure 4 through the perforations of the strainer, further aiding in the dislodgment of the accumulated debris during the mentioned flushing action.

I may also desire, simply for the purpose of permitting completely free, unimpeded flow of the fluid through the valve, to locate the strainer at times in the dotted line position shown in Figure 4, while the gate is in its Figure 4 position. This might be desirable in some instances in which the fluid passing through the valve may not have to be strained due to its nature and the use to which said fluid is to be put. This might be either a permanent or a temporary operational condition. In such an instance, it would be desirable to have a valve that could be arranged to permit flow of fluid with said fluid either being strained or left unstrained, according to the desires of the user. The valve which I have designed can be swiftly adjusted to permit its use under either of these operational conditions, and can be instantaneously converted for one or the other of these flow-permitting modes of use.

Apart from the above, the arrangement which has been illustrated and described herein has certain other desirable characteristics, worthy of note. In particular, it may be noted that the gasket 38 has an effective sealing action, when the gate is moved from its Figure 4 position into a position across the outlet. The gasket is transversely curved, in overlying relation to the body of the gate, and is secured at its periphery in this relationship to the body. The gasket might, of course, be also secured, by being bonded or in some other way, to the gate body at a location inwardly from the gasket periphery.

As previously noted herein, the outer surface of the gasket is curved on approximately the same radius as the strainer. Therefore, when the gate is moved from its Figure 4 position into its outlet-closing position, instead of the strainer seating against the valve seat, the gasket will now bear tightly against the valve seat. The valve seat, that is, the internal projection of the pipe 12, is curved complementarily to the strainer and gasket, so that both of these components will properly engage against the internal projection when they are in position across the outlet.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A valve comprising: a housing lying transversely of the path of the flow to be controlled, and having, in angularly spaced relation, an inlet and an outlet; a strainer and a gate transversely curved in concentric relation to the housing and mounted in the housing for swinging movement independently of each other about a common axis extending perpendicularly to said path of flow, said strainer and gate being angularly spaced about said axis within the housing and being selectively swingable into position about said axis within the housing across said outlet, the gate including gasket means sealably engaging said outlet when the gate is in said position; and means connected with the strainer and gate for operating the same to selected positions.

2. A valve comprising: a housing lying transversely of the path of the flow to be controlled, and having, in angularly spaced relation, an inlet and an outlet; a strainer and a gate transversely curved in concentric relation to the housing and mounted in the housing for swinging movement independently of each other about a common axis extending perpendicularly to said path of flow, said strainer and gate being angularly spaced about said axis within the housing and being selectively swingable into position about said axis within the housing across said outlet, the gate including gasket means sealably engaging said outlet when the gate is in said position; and means connected with the strainer and gate for operating the same to selected positions, comprising a pair of side-by-side handles radiating from said common axis exteriorly of the housing.

3. A valve comprising: a housing lying transversely of the path of the flow to be controlled, and having, in angularly spaced relation, an inlet and an outlet; a strainer and a gate transversely curved in concentric relation to the housing and mounted in the housing for swinging movement independently of each other about a common axis extending perpendicularly to said path of flow, said strainer and gate being angularly spaced about said axis within the housing and being selectively swingable into position about said axis within the housing across said outlet, the gate including gasket means sealably engaging said outlet when the gate is in said position; and means connected with the strainer and gate for operating the same to selected positions, comprising a pair of side-by-side handles radiating from said common axis exteriorly of the housing, said housing including an extension formed with guide slots guiding and limiting the handles in the swinging movement thereof.

4. A valve comprising: a housing lying transversely of the path of the flow to be controlled, and having, in angularly spaced relation, an inlet and an outlet; a strainer and a gate mounted in the housing for swinging movement independently of each other about a common axis extending perpendicularly to said path of flow, said strainer and gate being angularly spaced about said axis within the housing and being selectively swingable into position about said axis within the housing across said outlet, the gate including gasket means sealably engaging said outlet when the gate is in said position; and means connected with the strainer and gate for operating the same to selected positions, the strainer and gate being transversely curved, the gate including a body and a gasket overlying the body, said gasket being secured at least at its periphery to the body and being curved on a radius substantially equal to that about which the strainer is curved in concentric relation with the strainer, said gasket bearing tightly against the outlet to sealably close the same responsive to swinging of the gate into said position across the outlet.

5. A valve comprising: a housing lying transversely of the path of the flow to be controlled, and having, in angularly spaced relation, an inlet and an outlet; a strainer and a gate mounted in the housing for swinging movement independently of each other about a common axis extending perpendicularly to said path of flow, said strainer and gate being angularly spaced about said axis within the housing and being selectively swingable into position about said axis within the housing across said outlet, the gate including gasket means sealably engaging said outlet when the gate is in said position; and means connected with the strainer and gate for operating the same to selected positions, the strainer and gate being transversely curved, the gate including a body and a gasket overlying the body, said gasket being secured at least at its periphery to the body and being curved on a radius substantially equal to that about which the strainer is curved in concentric relation with the strainer, said gasket bearing tightly against the outlet to sealably close the same responsive to swinging of the gate into said position across the outlet, the housing having an internal projection about said outlet curved complementarily to the strainer and gasket to engage the same in their outlet-contacting positions.

6. A three-way control valve of the class described comprising: a housing having diametrically opposed inlet and outlet openings; a gate and a strainer mounted in the housing for rotation about a common axis independently of each other, each being movable between opposite extreme positions in one of which it extends across the outlet opening, said gate and strainer in their other extreme positions being disposed diametrically opposite one another clear of said outlet opening to permit unstrained flow of fluid past the strainer and gate through the outlet opening; and a pair of handles one having a connection to the gate and the other to the strainer, for rotating the same between their respective, opposite extreme positions.

7. A three-way control valve of the class described comprising: a housing having diametrically opposed inlet and outlet openings; a gate and a strainer mounted in the housing for rotation about a common axis independently of each other, each being movable between opposite extreme positions in one of which it extends across the outlet opening, said gate and strainer in their other extreme positions being disposed diametrically opposite one another clear of said outlet opening to permit unstrained flow of fluid past the strainer and gate through the outlet opening; and a pair of handles one having a connection to the gate and the other to the strainer, for rotating the same between their respective, opposite extreme positions, said handles extending exteriorly of the housing and being movable in closely spaced, parallel, generally coextensive paths between opposite extreme positions whereby both handles may be readily grasped and moved conjointly between their opposite extreme positions.

8. A three-way control valve of the class described comprising: a housing having diametrically opposed inlet and outlet openings; a gate and a strainer mounted in the housing for rotation about a common axis independently of each other, each being movable between opposite extreme positions in one of which it extends across the outlet opening, said gate and strainer in their other extreme positions being disposed diametrically opposite one another clear of said outlet opening to permit unstrained flow of fluid past the strainer and gate through the outlet opening; and a pair of handles one having a connection to the gate and the other to the strainer, for rotating the same between their respective, opposite extreme positions, said handles extending exteriorly of the housing and being movable in closely spaced, parallel, generally coextensive paths between opposite extreme positions whereby both handles may be readily grasped and moved conjointly between their opposite extreme positions, the handles being in side-by-side relation at one end of said paths when the strainer is in said one position thereof and the gate is in said other extreme position thereof, the handles being in side-by-side relation at the other ends of said paths when the gate is in said one position thereof and the strainer is in said other extreme position thereof, the handles being angularly spaced about said axis, at opposite ends of their paths, when the gate and strainer are both in said other extreme positions thereof.

References Cited in the file of this patent

UNITED STATES PATENTS

| | | |
|---|---|---|
| 491,261 | West | Mar. 22, 1892 |
| 784,170 | Miller | Mar. 7, 1905 |
| 808,910 | Dunham | Jan. 2, 1906 |
| 816,440 | Dunham | Mar. 27, 1906 |
| 1,168,668 | Morgan | Jan. 18, 1916 |
| 1,671,487 | Quiroz | May 29, 1928 |
| 1,896,134 | Clark | Feb. 7, 1933 |